United States Patent
Liu et al.

(10) Patent No.: US 7,742,766 B2
(45) Date of Patent: Jun. 22, 2010

(54) MOBILE NODE FOR DISCOVERING NEIGHBOR NETWORKS IN HETEROGENEOUS NETWORK ENVIRONMENT AND NETWORK DISCOVERY METHOD

(75) Inventors: Xiaoyu Liu, Yongin-si (KR); Hee-jin Jang, Yongin-si (KR); Youn-hee Han, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 11/255,925

(22) Filed: Oct. 24, 2005

(65) Prior Publication Data
US 2006/0183479 A1     Aug. 17, 2006

(30) Foreign Application Priority Data
Feb. 17, 2005    (KR) .................... 10-2005-0013049

(51) Int. Cl.
*H04W 36/00*    (2009.01)
(52) U.S. Cl. ................. 455/436; 455/437; 455/440; 455/443; 370/331
(58) Field of Classification Search .......... 455/436, 455/437, 440, 442, 443, 444; 370/331
See application file for complete search history.

(56) References Cited
U.S. PATENT DOCUMENTS 6,901,262 B2 * 5/2005 Allison et al. ............ 455/456.1
2002/0147008 A1 * 10/2002 Kallio ....................... 455/426
2004/0063426 A1 * 4/2004 Hunkeler ................. 455/426.1
2004/0166861 A1 * 8/2004 Trossen .................... 455/440
2005/0083886 A1 * 4/2005 Ikeda ........................ 370/331

FOREIGN PATENT DOCUMENTS

| JP | 11298965 A | 10/1999 |
|---|---|---|
| JP | 2004221730 A | 8/2004 |
| JP | 2004320473 A | 11/2004 |
| WO | 2004032539 A1 | 4/2004 |
| WO | WO 2005071866 A1 * | 8/2005 |

* cited by examiner

*Primary Examiner*—George Eng
*Assistant Examiner*—Marcos L Torres
(74) *Attorney, Agent, or Firm*—Sughrue Mion, PLLC

(57) ABSTRACT

A network discovery method in a heterogeneous network environment. The network discovery method includes receiving neighbor information indicating neighbor PoAs from a MIIS entity at a mobile node that includes a plurality of communication interface sections capable of communicating with different networks; checking at least one neighbor PoA using the neighbor information at the mobile node; and activating a communication interface section corresponding to the checked neighbor PoA at the mobile node. Accordingly, the neighbor networks can be discovered under the heterogeneous network environment and unnecessary power consumption can be avoided.

48 Claims, 11 Drawing Sheets

MOBILE NODE FOR DISCOVERING NEIGHBOR NETWORKS IN HETEROGENEOUS NETWORK ENVIRONMENT AND NETWORK DISCOVERY METHOD

CROSS-REFERENCE TO RELATED APPLICATIONS

This application claims the benefit under 35 U.S.C. §119(a) from Korean Patent Application No. 2005-13049 filed on Feb. 17, 2005 in the Korean Intellectual Property Office, the entire disclosure of which is incorporated herein by reference.

BACKGROUND OF THE INVENTION

1. Field of the Invention

The present invention relates generally to a mobile node (MN) for discovering a network to which the MN is handed over in a heterogeneous network environment, and method thereof. More specifically, the present invention relates to a mobile node (MN) and a network discovery method for discovering a neighbor network using neighbor information relating to neighbor point of attachments (PoAs) and activating only a communication interface corresponding to the discovered network.

2. Description of the Related Art

The prevalence of wireless Internet, the development of wireless communication technology, and the performance enhancement of portable computers lead to the increasing number of wireless Internet users. Under the wireless Internet environment, mobile nodes (MNs) are movable to other locations on occasion and thus change their point of attachment (PoA).

In case that a MN changes its location, communications in a current network environment need to be seamlessly maintained in a new network environment. In this regard, the idea of the handover is introduced. The handover is to hand communications over from an access node (AN) of the current network area to an AN of a next network area.

The MN may move into a wireless local area network (WLAN), a wireless metropolitan area network (WMAN), a cellular network, and so on. Generally, the WLAN environment conforms to Institute of Electrical and Electronics Engineers (IEEE) 802.11 standard, the WMAN environment conforms to IEEE 802.16 standard, and the cellular network environment conforms to $3^{rd}$ Generation Partnership Project (3GPP) standard.

The MN needs to discover a neighbor PoA for the handover. To this end, the communication standard of the network environment informs the MN of information relating to a PoA corresponding to its network environment so that the MN can discover a proper access network.

However, the conventional method cannot be adopted universally to a heterogeneous network environment including the WLAN, the WMAN, and the cellular network.

The MN can be connected to networks by implementing various communication interfaces that support the IEEE 802.11 standard, the IEEE 802.16 standard, and the 3GPP standard. Accordingly, the MN discovers the entire neighbor networks using its communication interfaces prior to the handover. In detail, the MN broadcasts a network discovery message to its neighbors via the communications interfaces and then determines whether a response message is received. In other words, the handover requires that the MN maintain the entire communication interfaces in an active mode all the time, which causes high power consumption.

In the related art, the MN has to send a separate message to determine whether to change its IP network address in the handover ready process after the network discovery. As a result, the handover ready process takes a longer time and additional power consumption is needed.

SUMMARY OF THE INVENTION

The present invention has been provided to solve the above-mentioned and other problems and disadvantages occurring in the conventional arrangement, and an aspect of the present invention provides a mobile node (MN) and method for discovering a network under a heterogeneous network environment by receiving neighbor information relating to neighbor point of attachment (PoA) from a Media Independent Information Service (MIIS) entity and activating only a communication interface corresponding to the neighbor information.

Another aspect of the present invention provides a MIIS entity and method for providing neighbor information so that a MN can discover networks, and dynamically managing the neighbor information using report information received from the MN.

Yet another aspect of the present invention provides a MN and method for promptly determining whether to change an IP network address by receiving IP handover information that notifies IP handover between neighbor PoAs.

To achieve the above aspects and/or features of the present invention, a network discovery method in a heterogeneous network environment, includes receiving neighbor information indicating neighbor point of attachments (PoAs) from a Media Independent Information Service (MIIS) entity at a mobile node that includes a plurality of communication interface sections capable of communicating with different networks; checking at least one neighbor PoA using the neighbor information at the mobile node; and activating a communication interface section corresponding to the checked neighbor PoA at the mobile node.

The activating of the communication interface section may power up by supplying power to the communication interface section that corresponds to the checked PoA.

The network discovery method may further include transmitting a neighbor information request packet to the MIIS entity at the mobile node; and receiving the neighbor information from the MIIS entity that receives the request packet at the mobile node.

The MIIS entity stores a Media Independent Neighbor Graph (MING) that includes neighbor information relating to the PoAs in the heterogeneous network environment.

The MING may be configured and stored in advance by a network administrator.

The MING may be configured by neighbor report information transmitted from MNs in the heterogeneous network environment.

The MN may receive neighbor information broadcast by the MIIS entity by periods. The MN may receive neighbor information broadcast from a current PoA by periods.

The plurality of the communication interface sections may communicate according to one of Institute of Electrical and Electronics Engineers (IEEE) 802.3 standard, IEEE 802.11 standard, 802.16 standard, $3^{rd}$ Generation Partnership Project (3GPP) standard, and 3GPP2 standard, respectively. The neighbor PoA may be at least one of an access point (AP) connected to a wireless local area network (WLAN), a remote access server (RAS) connected to a wireless metropolitan area network (WMAN), and a base station (BS) connected to a cellular network.

The neighbor information may indicate only a neighbor PoA to which the MN can handed over.

The MING may further contain Internet protocol (IP) handover information that informs whether a handover between PoAs is an IP handover.

The network discovery method may further include receiving, at the MN, the IP handover information from the MIIS entity that informs whether a handover between PoAs is the IP handover; and determining, at the MN, whether to change an IP network address according to the IP handover information.

In accordance with another aspect of the present invention, a handover method in a heterogeneous network environment, includes receiving neighbor information indicating neighbor point of attachments (PoAs) from a Media Independent Information Service (MIIS) entity at a mobile node (MN) that includes a plurality of communication interface sections capable of communicating with different networks; checking at least one neighbor PoA using the neighbor information at the mobile node; activating a communication interface section corresponding to the checked neighbor PoA at the mobile node; performing a handover to one of the PoAs via the activated communication interface section; and transmitting to the MIIS entity neighbor report information that records information relating to a previous PoA and a new PoA when the handover is completed.

The handover method may further include transmitting to the MIIS entity Internet Protocol (IP) handover report information that informs an IP handover is conducted, when an IP network address is changed during the handover of the MN.

A network discovery method in a heterogeneous network environment, includes receiving a request packet from a mobile node (MN) at a Media Independent Information Service (MIIS) entity that stores a Media Independent Neighbor Graph (MING) recording neighbor information relating to PoAs in the heterogeneous network environment; detecting neighbor information relating to neighbor PoAs of the MN from the MING at the MIIS entity; and transmitting the detected neighbor information to the MN.

The MING may be configured and stored in advance by a network administrator.

The network discovery method may further include receiving, at the MIIS entity, neighbor report information recording information relating to a previous PoA and a new PoA from MNs in the heterogeneous network environment; and updating, at the MIIS entity, the MING according to the neighbor report information.

The network discovery method may further include receiving, at the MIIS entity, Internet protocol (IP) handover report information that informs that an IP handover is conducted, from the MNs in the heterogeneous network environment; and updating, at the MIIS entity, the MING according to the IP handover report information.

In accordance with still another aspect of the present invention, a network discovery method in a heterogeneous network environment, includes configuring a Media Independent Neighbor Graph (MING) that records neighbor information relating to PoAs at a MIIS entity in the heterogeneous network environment; and broadcasting the neighbor information recorded in the MING by periods at the MIIS entity.

The MING may be configured and stored in advance by a network administrator.

The network discovery method may further include receiving, at the MIIS entity, neighbor report information that records information relating to a previous PoA and a new PoA from MNs in the heterogeneous network environment; and updating, at the MIIS entity, the MING according to the neighbor report information.

The network discovery method may further include receiving, at the MIIS entity, Internet protocol (IP) handover report information that informs that an IP handover is conducted, from the MNs in the heterogeneous network environment; and updating, at the MIIS entity, the MING according to the IP handover report information.

In accordance with yet another aspect of the present invention, a mobile node that operates in a heterogeneous network environment, includes a plurality of interface sections operating in one of an active mode and a sleep mode and communicating with a certain type of a network in the active mode; a communication section communicating with a point of attachment (PoA) via one of the plurality of the interface sections; and a controller switching an operation mode of the interface sections corresponding to neighbor PoAs into the active mode when neighbor information indicating neighbor PoAs of a current PoA is received from a Media Independent Information Service (MIIS) entity.

The controller may power up by supplying power to the interface section corresponding to the neighbor PoAs, respectively.

The controller may switch an operation mode of at least one of the interface sections which correspond to the neighbor PoAs, into the active mode and the controller may switch an operation mode of the rest of the interface sections into the sleep mode.

The controller may request the transmission of the neighbor information by controlling the communication section to transmit a request packet for the neighbor information to the MIIS entity.

The communication section may receive neighbor information that is broadcast from the MIIS entity by periods. The communication section may receive neighbor information that is broadcast from the current PoA by periods.

The controller may transmit to the MIIS entity neighbor report information that records information relating to a previous PoA and a new PoA when a handover is conducted.

The controller may control the communication section to transmit to the MIIS entity Internet protocol (IP) handover report information that informs an IP handover is conducted when an IP network address is changed during the handover.

The communication section may receive from the MIIS entity IP handover information that informs whether a handover between the neighbor PoAs is the IP handover. The controller may determine whether to change the IP network address according to the IP handover information.

The neighbor PoA may be at least one of an access point (AP) connected to a wireless local area network (WLAN), a remote access server (RAS) connected to a wireless metropolitan area network (WMAN), and a base station (BS) connected to a cellular network.

The plurality of the interface sections may communicate according to one of Institute of Electrical and Electronics Engineers (IEEE) 802.3 standard, IEEE 802.11 standard, 802.16 standard, $3^{rd}$ Generation Partnership Project (3GPP) standard, and 3GPP2 standard.

The plurality of the interface sections may include at least one of a first interface section supporting a communication standard for the WLAN, a second interface section supporting a communication standard for the WMAN, and a third interface section supporting a communication standard for the cellular network.

The neighbor information may indicate only a neighbor PoA to which the MN can be handed over at present.

In accordance with yet another aspect of the present invention, a Media Independent Information Service (MIIS) entity that operates in a heterogeneous network environment, includes a storage storing a Media Independent Neighbor Graph (MING) that records neighbor information relating to PoAs in the heterogeneous network; and a controller transmitting neighbor information relating to neighbor PoAs of a current PoA to which a mobile node (MN) is connected in the heterogeneous network.

The controller may transmit the neighbor information when a request packet is received from the MN.

The controller may broadcast neighbor information recorded in the MING by periods.

The MING may be configured and stored in advance by a neighbor administrator.

The MING may be configured by neighbor report information transmitted from MNs in the heterogeneous network.

The controller may update the MING stored in the storage according to neighbor report information when the neighbor report information relating to a previous PoA and a new PoA is transmitted from a MN that is handed over in the heterogeneous network.

The MING may further record Internet protocol (IP) handover information that informs whether a handover between PoAs in the heterogeneous network is an IP handover.

The controller may transmit the IP handover information to a MN when a request packet is received by the MN in the heterogeneous network.

The controller may update the MING stored in the storage according to IP handover report information when the IP handover report information informing change of an IP network address is transmitted from a MN that is handed over in the heterogeneous network.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF THE EMBODIMENTS

Figure 1:
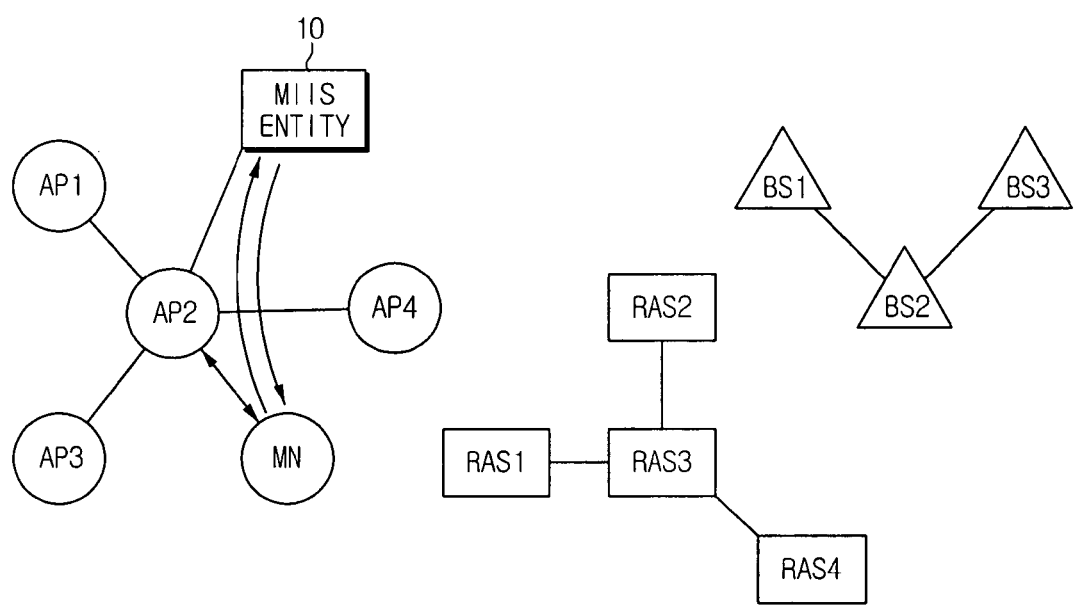
FIG. 1 is a conceptual diagram of a network discovery method in a heterogeneous network environment according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 is a conceptual diagram illustrating a network discovery method in a heterogeneous network environment according to an embodiment of the present invention. In FIG. 1, there are a wireless local area network (WLAN), a wireless metropolitan area network (WMAN), and a cellular network in the heterogeneous network environment. A point of Attachment (PoA) of the WLAN may be an access point (AP), that of the WMAN may be a remote access server (RAS), and that of the cellular network may be a base station (BS).

When a mobile node (MN) currently connected to an AP2 intends to discover neighbor networks, the MN sends a neighbor information request packet to a Media Independent Information Service (MIIS) entity 10. The MIIS entity 10 provides the neighbor information to the MN. The neighbor information may pertain to PoAs around the AP2.

Figure 2:
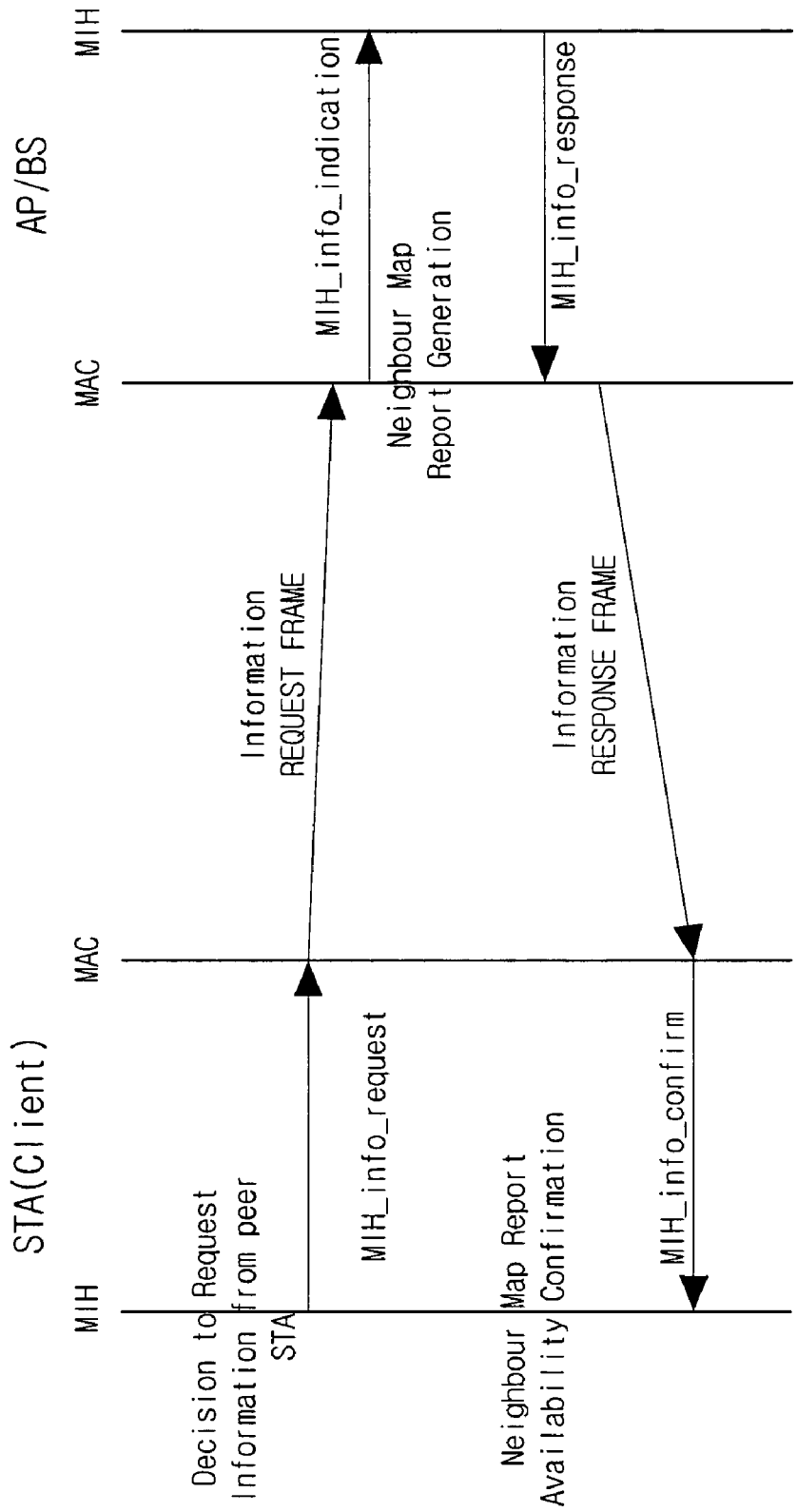
FIG. 2 is a conceptual diagram of transmissions of a request packet and corresponding neighbor information.

FIG. 2 is a conceptual diagram of transmissions of a request packet and corresponding neighbor information. In FIG. 2, a MN intending to perform a Media Independent Handover (MIH), that is, a station (STA) transmits a handover information request packet over a Media Access Control (MAC) layer. PoA of the STA, that is, AP or BS transmits neighbor information to the STA in response to the request packet. The neighbor information is provided from the MIIS entity which is present in networks.

The MIIS entity is responsible to provide information required for the handover. Information services of the MIIS can be classified into General Network Information (GNI), Link Layer Information (LLI), and Higher Layer Information (HLI). The GNI pertains to a general overview of the network such as network ID, location of different PoAs of the network, IP version, and so on. The LLI includes information relating to link layers, such as layer parameters (channel, frequency, PHY types), data rates, neighbor information, security, quality of service (QoS), and so on. The HLI is higher layer-related information such as types of supported applications, mobile IP, and so on. In an exemplary embodiment of the present invention, the neighbor information is the LLI. Table 1 shows an example of the LLI stored in the MIIS entity.

TABLE 1

| \< Link Layer Information (LLI) \> | | | |
|---|---|---|---|
| Name of Information Element | Description | Media Types | Comments |
| Neighbor information | Neighboring network information, measurement | All | Technology specific information |

TABLE 1-continued

< Link Layer Information (LLI) >

| Name of Information Element | Description | Media Types | Comments |
| --- | --- | --- | --- |
| Security | report Link layer security supported | All | Technology specific, e.g. WEP in 802.11, 802.11i, PKM in 802.16, UEA in 3G, Authentication, EncryptionMode, EncryptionAlgorithm, Keyprovisioning, KeyManagement |
| Quality of Service | Link QoS parameter | | E.g. VER, SNR, DataRateKbps, MinLatencyMsec, MaxLatencyMsec, MaxJitterMsec |
| AccessRouterInfo | | | AccessRouterAddress, IPversion, MobilityProtocolSupport, FASupport |

Figure 3:
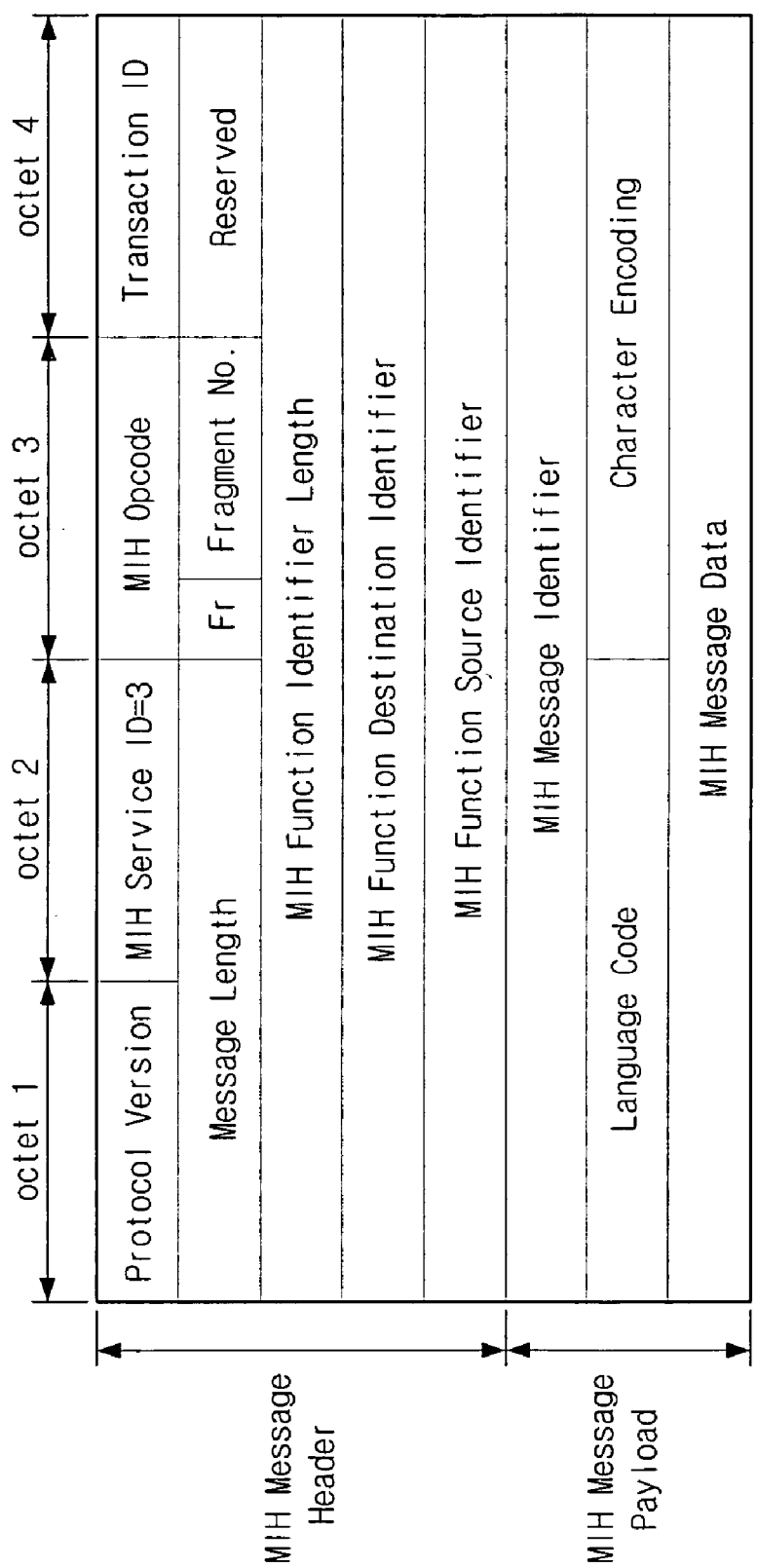
FIG. 3 is a conceptual diagram of the request packet format.

FIG. 3 is a conceptual diagram of a request packet format. Referring to FIG. 3, the request packet consists of a header and a payload. The header contains information such as ID of a packet transmitter (MIH Function Source Identifier), destination ID (MIH Function Destination Identifier), protocol version, message length, and so on. The payload contains a message requesting the neighbor information (MIH Message Data).

When receiving the neighbor information in response to the request packet, the MN recognizes its neighbor PoAs based on the neighbor information. Only communication interfaces corresponding to the neighbor PoAs are activated. For example, if the MN learns from the neighbor information that there are AP3, AP4, and RAS1 around the connected AP2, only the IEEE 802.11 standard communication interface and the IEEE 802.16 standard communication interface for the WLAN and the WMAN are activated. In contrast, the 3$^{rd}$ Generation Partner Project (3GPP) standard communication interface corresponding to the cellular network is inactivated. Consequently, unnecessary power consumption can be avoided.

To provide the neighbor information, the MIIS entity 10 pre-stores Media Independent Neighbor Graph (MING) recording the neighbor information. The MING may be configured manually and stored by a network administrator. Alternatively, the MING may be configured and managed using report information provided from MNs in the heterogeneous network environment. If a MN is handed over, the MN sends neighbor report information to the MIIS entity 10 to inform its previous PoA and its new PoA.

Figure 4:
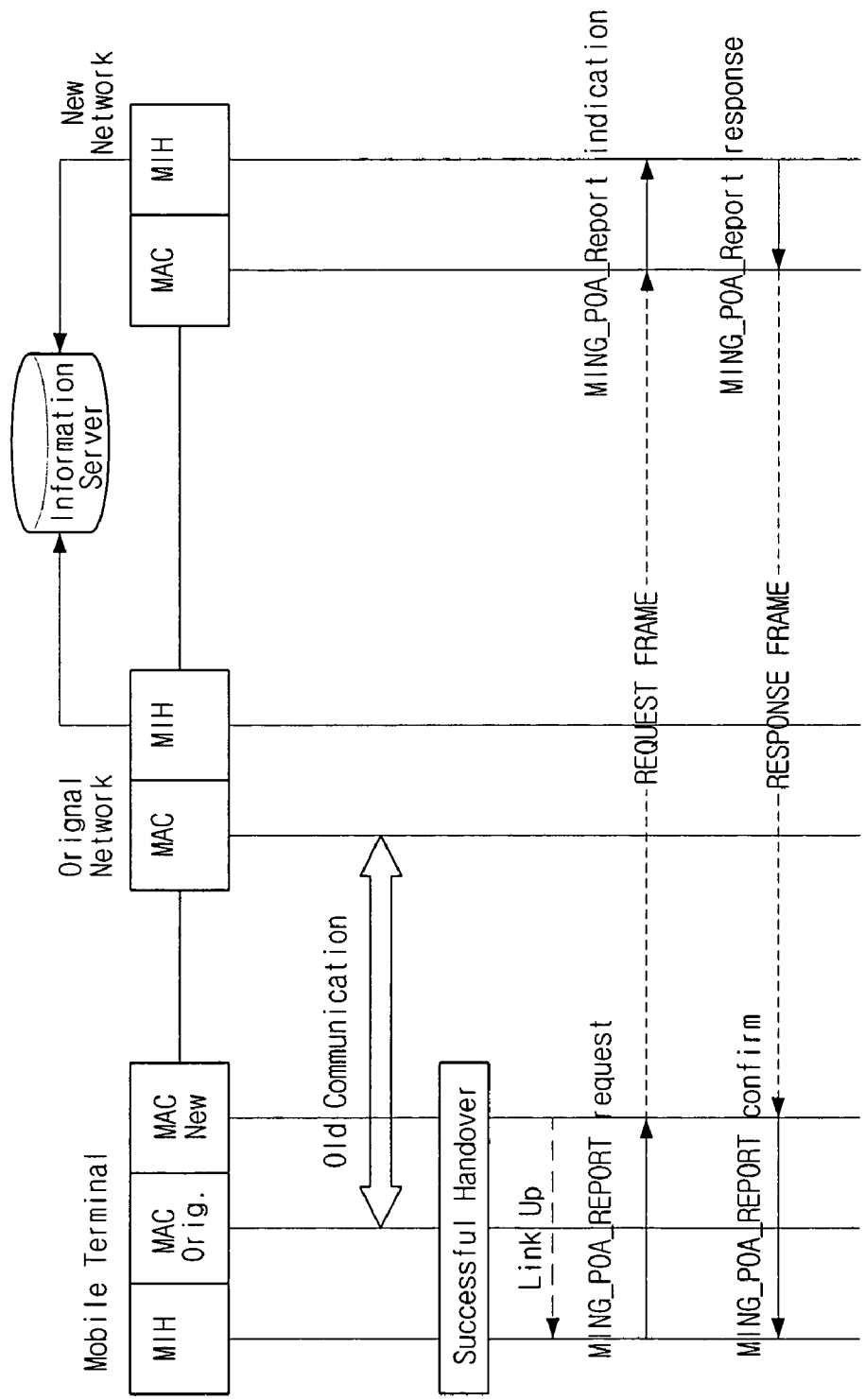
FIG. 4 is a conceptual diagram of transmission of neighbor report information to dynamically manage a Media Independent Neighbor Graph (MING)

FIG. 4 is a conceptual diagram of the transmission of the neighbor report information. As shown in FIG. 4, when a mobile terminal is successfully handed over from an original network to a new network, the mobile terminal transmits to an information server the neighbor report information (MING PoA Report) containing information relating to a previous PoA and a new PoA via the new PoA of the new network. Herein, the information server is the MIIS entity 10. The MIIS entity 10 updates the existing MING according to the neighbor report information. Hence, the neighbor relationship among the PoAs can be managed flexibly.

The neighbor report information can be represented as below.

MING_POA_Report.request
(
Current PoA,
MING_POA_REPORT,
Neighbor Status,
)

Contents contained in the neighbor report information can be arranged in Table 2.

TABLE 2

| Name | Type | Valid Range | Description |
| --- | --- | --- | --- |
| Current PoA | | N/A | Current PoA the sending STA makes a connection with |
| MING_POA_REPORT | | N/A | Discovered PoAs and the related ANI, LLI, and HLSI found. |
| Neighbor Status | Yes/ Don't know yet | N/A | For the PoA known after successful handover, the Neighbor Status is "Yes" For the PoA discovered anyhow at any time (except handover), the Neighbor Status is "Don't know yet" |

In Table 2, Current PoA denotes information relating to the PoA currently connected. MING_POA_REPORT includes the discovered PoA, relevant Access Network Information (ANI), Link Layer Information (LLI), Higher Layer Service Information (HLSI), and so on. Neighbor Status is marked with "Yes" when the PoA is changed due to the handover, or otherwise marked with "Don't know yet", to inform the neighbor status.

The MN can receive IP handover information from the MIIS entity 10. It is noted that the IP handover information can be separately requested and received. IP handover is the handover to a different layer 3 network, that is, to a different subnet. In case of the handover to the layer 3 network, the IP network address is changed. The IP handover information indicates whether a handover between PoAs is the IP handover or not. Ultimately, the MN can determine whether to change its IP network address by confirming the IP handover information. Specifically, the IP handover information being "1" indicates the IP handover, and the IP handover information being "0" indicates the non-IP handover. Therefore, there is no need to check the change of the IP network address.

To do this, the MIIS entity 10 records the IP handover information in addition to the neighbor information, in the MING. The IP handover information may be manually configured and stored by a network manager. Alternatively, the IP handover information may be configured using IP handover report information provided from MNs in the heterogeneous network environment.

The MIIS entity 10 can extend or refresh the existing MING by use of the received neighbor report information and IP handover report information. If the neighbor report information is not received over a predefined time, relevant neighbor information may be eliminated.

Figure 5:
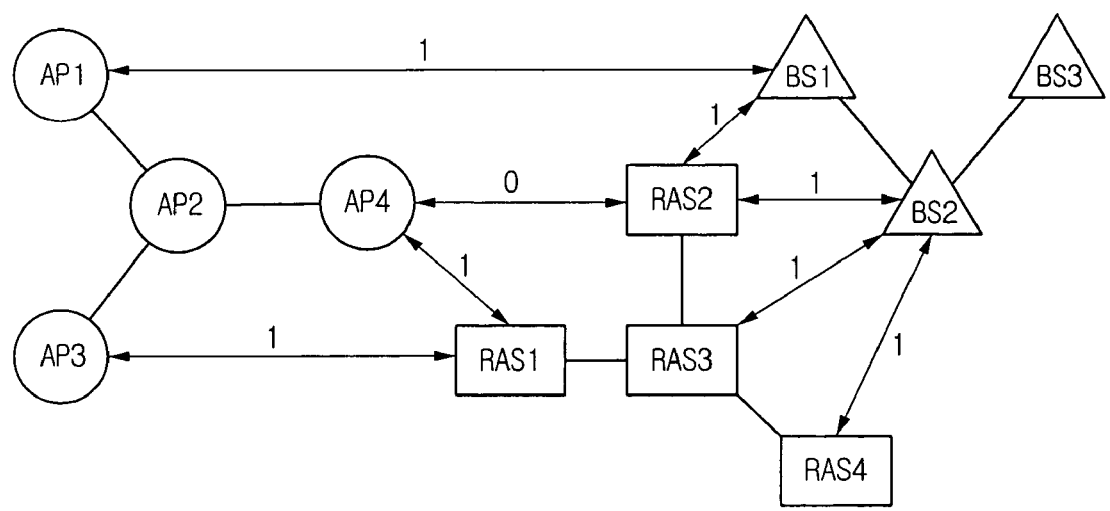
FIG. 5 is a conceptual diagram of a structure of the MING stored in a Media Independent Information Service (MIIS) entity as illustrated in FIG. 1.

FIG. 5 is a conceptual diagram illustrating a structure of the MING stored in the MIIS entity 10. In FIG. 5, the MING records neighbor relationship among PoAs AP1 through AP4, RAS1 through RAS 4, and BS1 through BS3 in the heterogeneous network environment. The neighbor relationship is represented as branches as illustrated in FIG. 5, and the IP handover information is marked on each branch. The IP handover information is marked as "0" or "1". As illustrated In FIG. 5, neighbor PoAs, of the AP4 are AP2, RAS1, and RAS2. As for the handover to the RAS1, it can be seen that the IP network address is changed. The MIIS 10 may configure and store the MING, as shown in FIG. 5, into a database.

Although the MIIS entity 10 is equipped as a separate device in the heterogeneous network of FIG. 1 and FIG. 2, each PoA can function as the MIIS entity. In this case, the PoA stores only the MING as to its neighbor PoAs and the IP handover without having to store the entire MING. Even when a separate request packet is not received from the MN, the PoA may periodically broadcast the neighbor information.

In the embodiment of the present invention, the MIIS entity is present as a single device. It is to be understood that each PoA can operate as the MIIS entity. In this case, the PoA only needs to store the MING pertaining to its neighbor PoAs and the IP handover or non-IP handover, without having to store the whole MING. Also, the PoA can broadcast the neighbor information by periods even when a separate request packet is transmitted from the MN.

Figure 6:
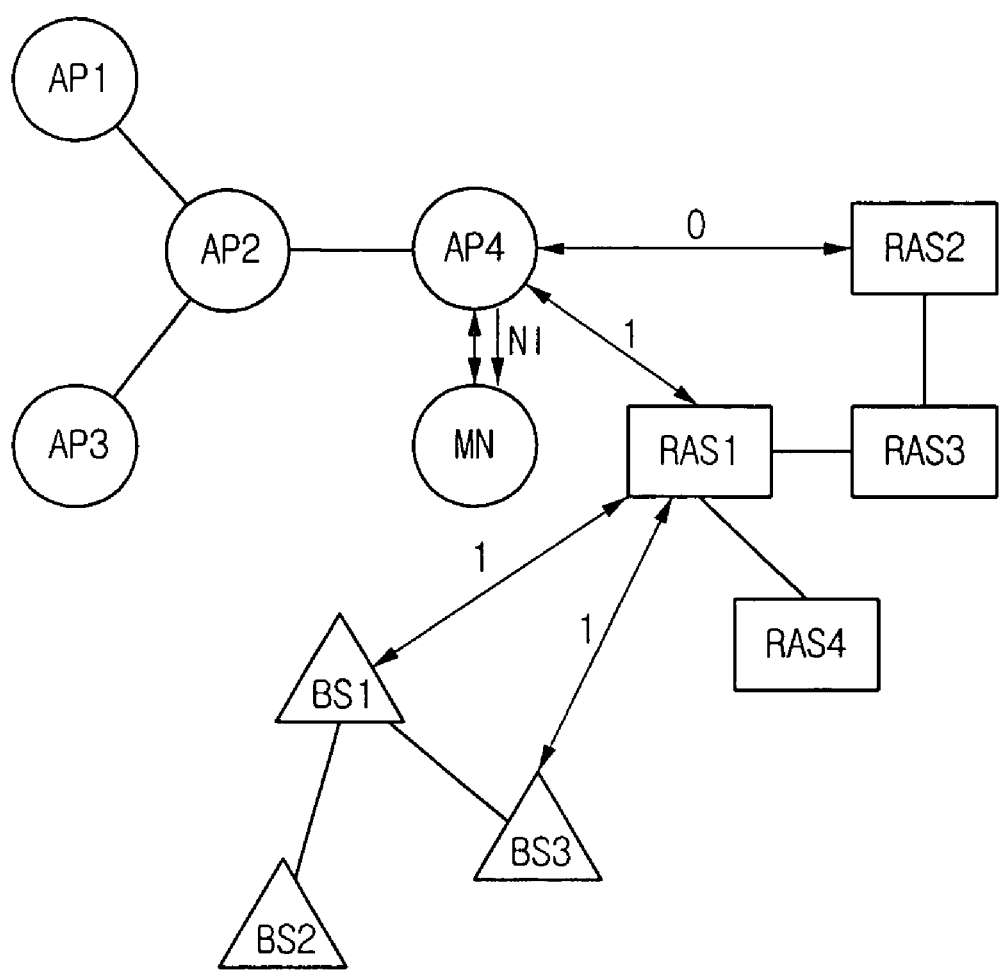
FIG. 6 is a conceptual diagram of the network discovery method in a heterogeneous network environment according to an embodiment of the present invention.

FIG. 6 is a conceptual diagram illustrating a network discovery method when each PoA functions as the MIIS entity in the heterogeneous network environment. Referring to FIG. 6, the MN is connected to the AP4 at present. Thus, the AP4 provides the MN with the neighbor information relating to its neighbor PoAs AP2, RAS1, and RAS2. As described above, the MN may request the neighbor information by separately transmitting the request packet to the AP4, or receive the neighbor information that is periodically broadcast from the AP4 over its communication coverage area. The IP handover information "1" between the AP4 and the RAS1 and the IP handover information "0" between the AP4 and the RAS2 are provided to the MN in the same manner.

The MN activates only IEEE 802.11 and 802.16 standard communication interfaces corresponding to the AP2, the RAS1, and the RAS2. The MN discovers a new PoA for the handover through communications with the AP2, the RAS1, and the RAS2. When the handover to the RAS2 is determined, the IP network address is changed immediately to thus reduce the handover ready time.

Figure 7:
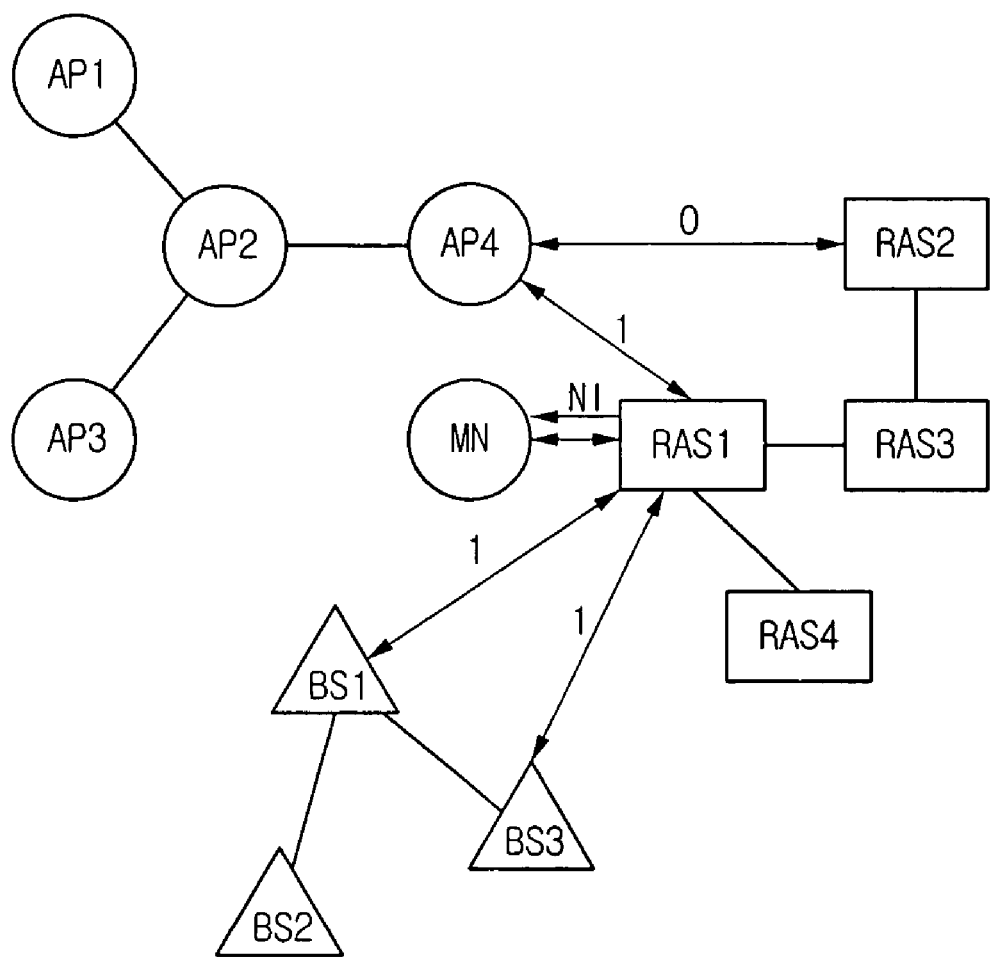
FIG. 7 is a conceptual diagram of the network discovery method in a heterogeneous network environment according to an embodiment of the present invention.

FIG. 7 is a conceptual diagram illustrating another case when each PoA functions as the MIIS entity in the heterogeneous network environment. In FIG. 7, the MN is connected to the RAS1 at present. Similar to FIG. 6, the MN receives the neighbor information from the RAS1. The RAS1 informs the MN of its neighbor PoAs AP4, BS1, BS3, RAS4, and RAS3. The MN activates all of the IEEE 802.11 standard communication interface, the IEEE 802.16 standard communication interface, and the 3GPP standard communication interface. As it can be seen that the IP handover occurs among the AP4, the BS1, and the BS3, a separate message transmission to the neighbor PoAs is not required to check the occurrence of the IP handover.

It has been illustrated that the neighbor information relates to all the PoAs, but only information as to different neighbor PoAs from the current PoA connected to the MN can be used as the neighbor information.

Figure 8:
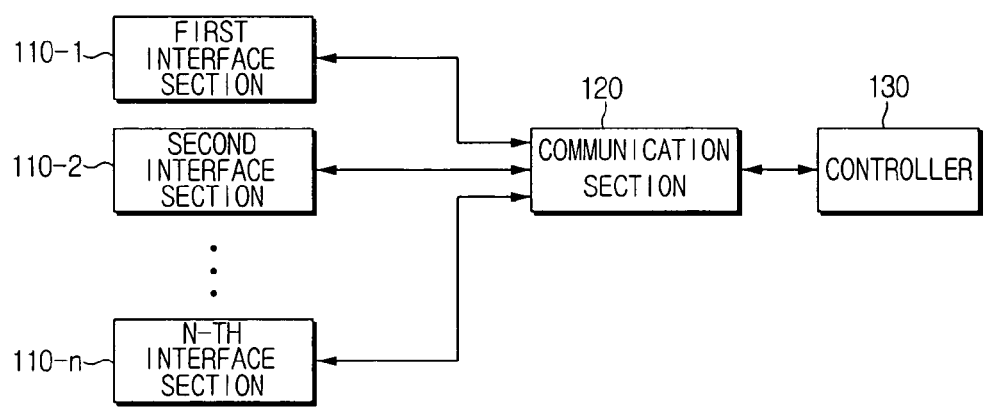
FIG. 8 is a block diagram of a mobile node according to an embodiment of the present invention.

FIG. 8 is a block diagram of a MN according to an embodiment of the present invention. In FIG. 8, the MN includes first through n-th interface sections 110-1 through 110-n, a communication section 120, and a controller 130. The MN may be a notebook computer, a mobile phone, and a personal digital assistant (PDA).

The first through n-th interface sections 110-1 through 110-n operate in an active mode or in a sleep mode. In the active mode, the first through n-th interface sections 110-1 through 110-n are responsible for communications with the heterogeneous network. In detail, the first through n-th interface sections 110-1 through 110-n can be IEEE 802.11 standard communication interface, IEEE 802.16 standard communication interface, and 3GPP standard communication interface according to the WLAN, the WMAN, and the cellular network. In the sleep mode, the first through n-th interface sections 110-1 through 110-n stand by without receiving a driving voltage from a power source (not shown).

The communication section 120 transmits and receives a message to and from the network via at least one interface section in the active mode among the first through n-th interface sections 110-1 through 110-n. The communication section 120 may receive the neighbor information by sending the neighbor information request packet to the MIIS entity 10 under the control of the controller 130. As aforementioned, in case that the connected PoA functions as the MIIS entity 10, the neighbor information broadcast from the PoAs can be received without the separate transmission of the neighbor information request packet.

The communication section 120 can receive the IP handover information indicating the occurrence of the IP handover together with the neighbor information.

The controller 130 checks the neighbor information received via the communication section 120 so that the communication section 120 recognizes the neighbor PoAs of the connected PoA. The controller 130 switches an interface section corresponding to the recognized neighbor PoAs among the first through n-th interface sections 110-1 through 110-n, into the active mode. Accordingly, the communication section 120 can communicate with the neighbor PoAs via the activated interface section and thus discover a PoA for the handover. The controller 130 determines whether to change the IP network address based on the IP handover information received via the communication section 120.

As described above, the MING including the neighbor information and the IP handover information may be configured manually by a network administrator and stored at the MIIS entity 10, or, may be dynamically configured and managed by the MIIS entity 10 using the report information provided from the MN.

When dynamically managing the MING, the controller 130 controls the communication section 120 to send the neighbor report information to the MIIS entity 10 whenever the handover is completed. The neighbor report information contains information relating to the previous PoA and the new PoA. If the IP network address changes during the handover, the IP handover report information is provided to the MIIS entity 10. Thus, the MIIS entity 10 can update the existing MING on occasion.

Figure 9:
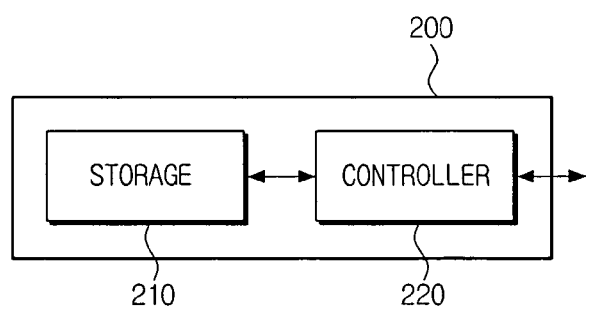
FIG. 9 is a block diagram of a MIIS entity according to an embodiment of the present invention.

FIG. 9 is a block diagram of a MIIS entity according to an embodiment of the present invention. Referring to FIG. 9, the MIIS entity 200 includes a storage 210 and a controller 220.

The storage 210 stores the MING that records the neighbor information relating to the PoAs in the heterogeneous network.

The controller 220 transmits the neighbor information to a MN in the heterogeneous network. In more detail, when a neighbor information request packet is received from a MN, neighbor information relating to the current connected PoA of the MN is retrieved from the MING stored in the storage 210. The retrieved neighbor information is transmitted to the MN. According to another embodiment of the present invention, the controller 220 can broadcast the neighbor information recorded in the MING to MNs over the heterogeneous network by periods.

As described above, the MING can be manually configured and managed by a network administrator. Alternatively, the MING may be dynamically managed by the neighbor report information transmitted from MNs. As for the dynamic management of the MING, the controller 220 receives the neighbor report information from MNs and checks a previous PoA and a new PoA that are recorded in the neighbor report information. When the checked information matches the existing neighbor relationship, the MING is maintained. Conversely, when the checked information is different from the existing neighbor relationship, the neighbor relationship is modified. The neighbor relationship between PoAs of which the neighbor report information is not transmitted over a certain time may be eliminated.

The MING stored in the storage 210 can further record the IP handover information informing whether the handover between the PoAs in the heterogeneous network is the IP handover or not. The IP handover information, similar to the neighbor information, can be manually configured and managed, and dynamically configured and managed by the IP handover report information.

Figure 10:
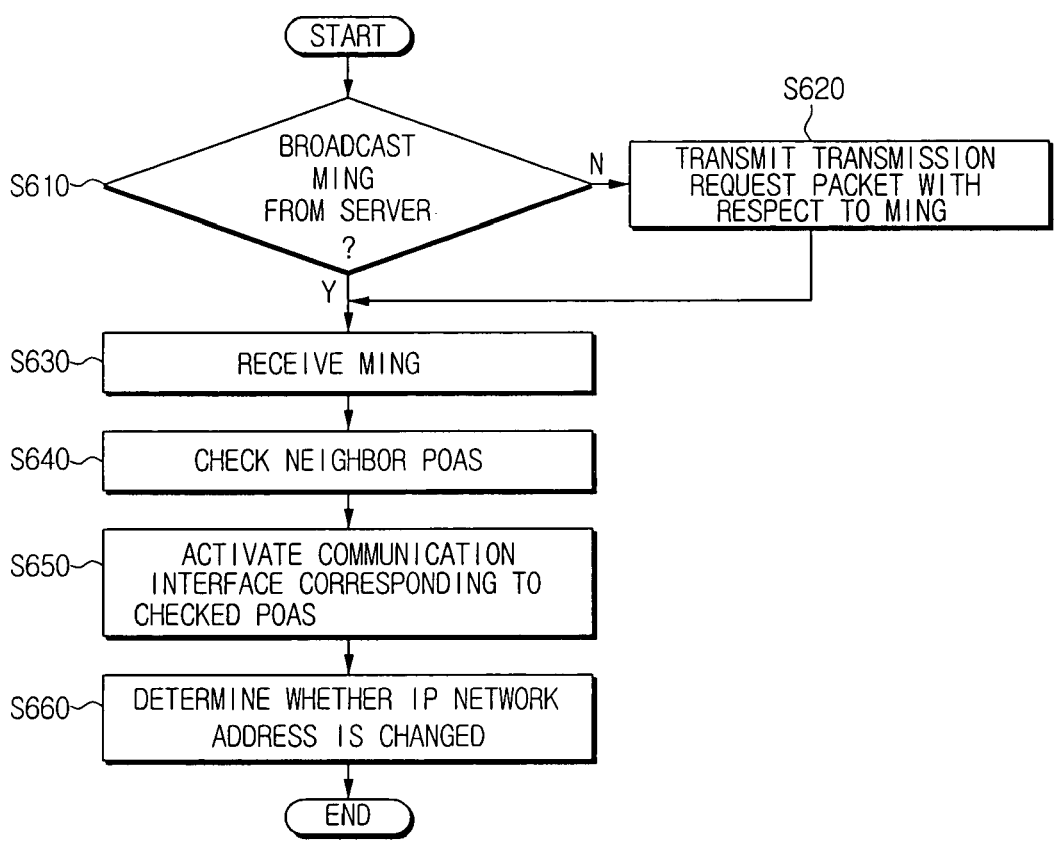
FIG. 10 is a flowchart of the network discovery method according to an embodiment of the present invention.

FIG. 10 is a flowchart explaining the network discovery method of the MN according to an embodiment of the present invention. In FIG. 10, when the MING is broadcast from the MIIS entity 10 (S610) or the MING is received in response to the transmission request packet (S620 and S630), the MN identifies the neighbor PoAs using the neighbor information of the MING (S640).

The interface sections corresponding to the identified PoAs are activated (S650) to discover the PoA for the handover.

Next, whether to change the IP network address is determined based on the IP handover information of the MING (S660). When the handover ready process is finally completed, the handover is conducted.

Figure 11:
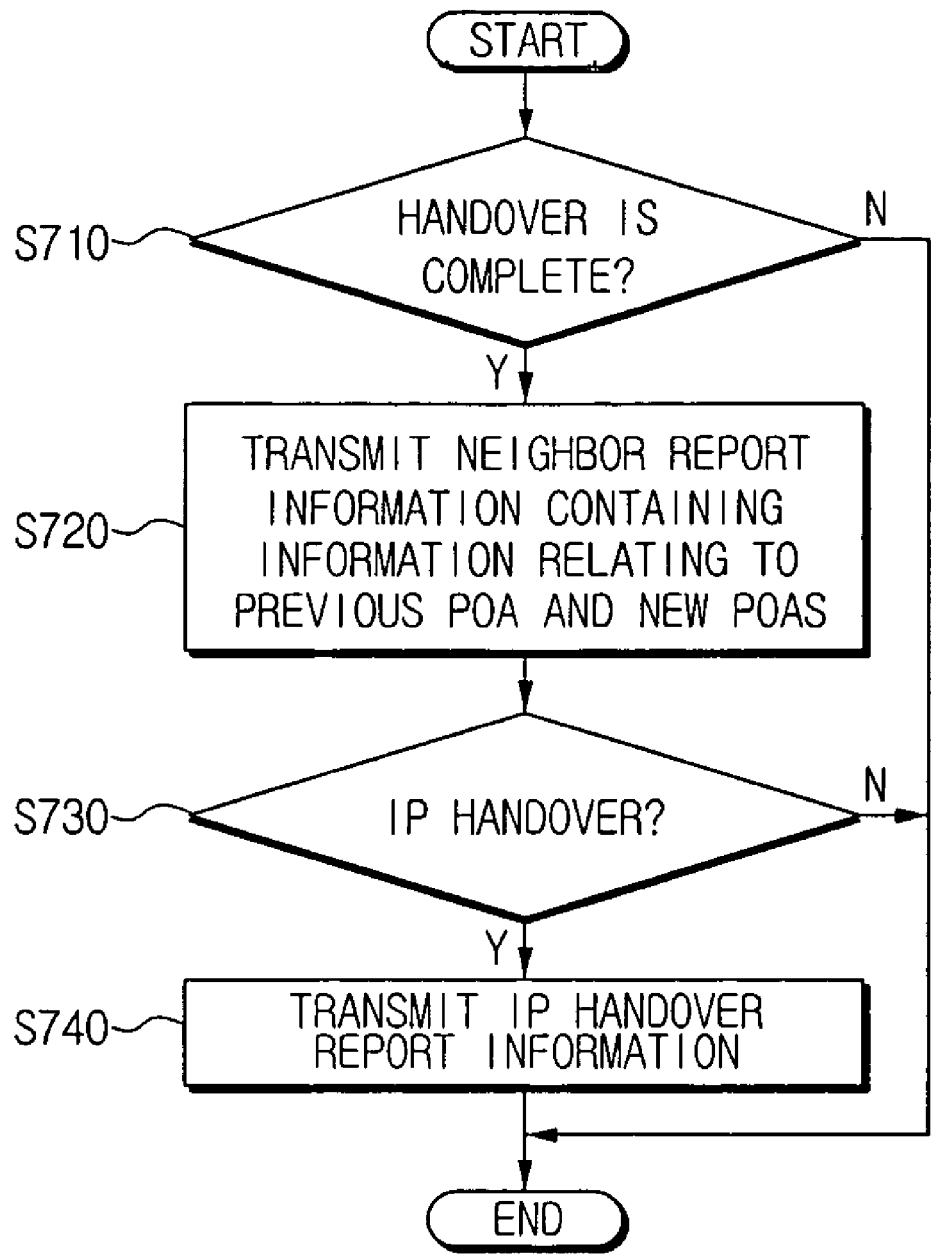
FIG. 11 is a flowchart of a MING update method in the heterogeneous network environment according to an embodiment of the present invention.

FIG. 11 is a flowchart explaining how the MN manages the MING in the heterogeneous network environment according to an embodiment of the present invention. Referring to FIG. 11, after the handover (S710), the MN transmits the neighbor report information including the information relating to the previous PoA and the new PoA, to the MIIS entity 10 (S720).

The determination is made on whether the IP network address is changed (S730). If the IP network address is changed, the IP handover report information is transmitted to the MIIS entity 10 (S740).

Figure 12:
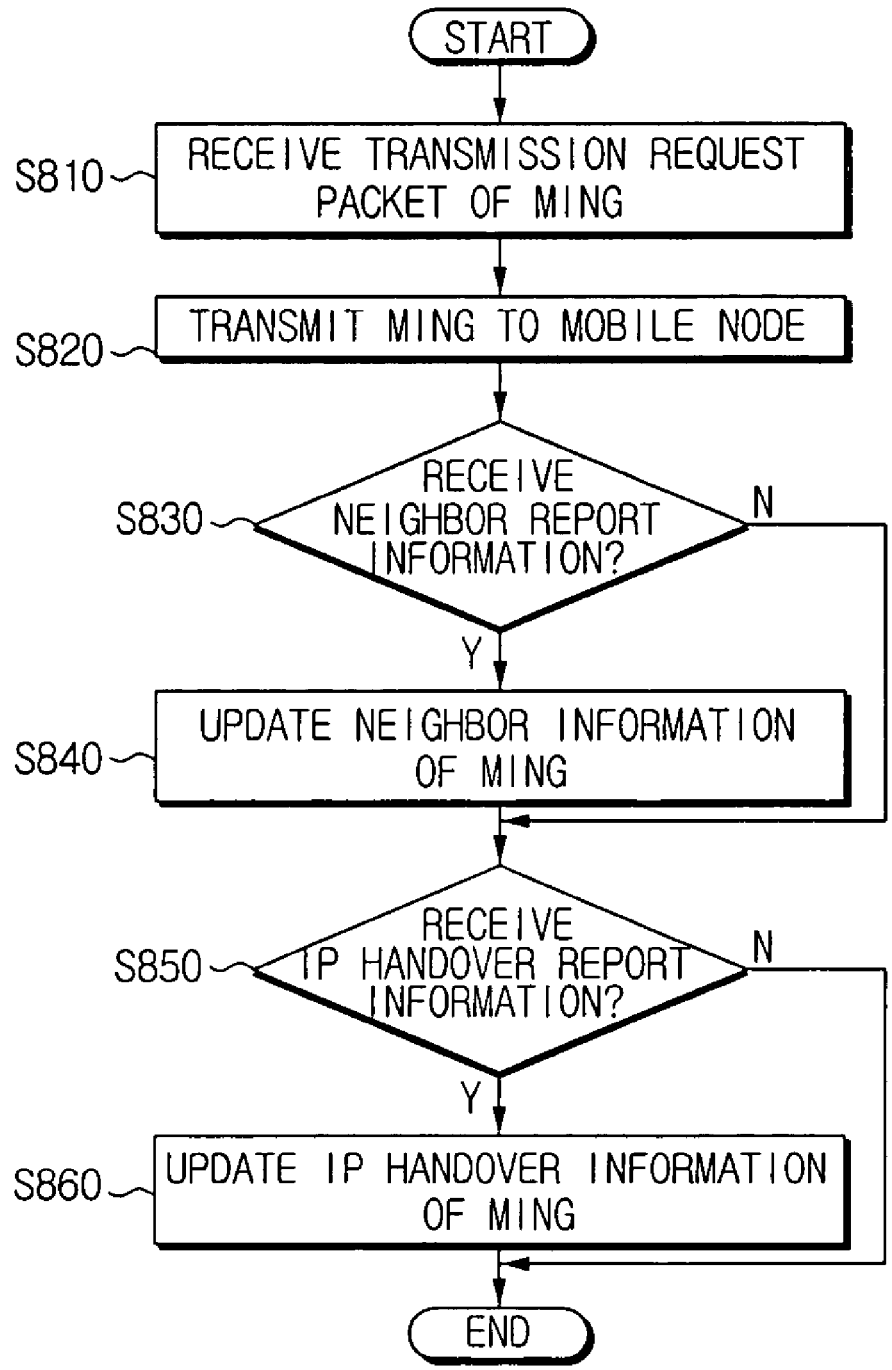
FIG. 12 is a flowchart of the MING update method in the heterogeneous network environment according to an embodiment of the present invention.

FIG. 12 is a flowchart explaining the operation of the MIIS entity in the heterogeneous network environment according to an embodiment of the present invention. In FIG. 12, upon receiving the neighbor information request packet (S810), the MING is transmitted to the MN (S820). According to another embodiment of the present invention, the MIIS entity 10 may broadcast the MING by periods.

Upon receiving the neighbor report information from the MN, the MIIS entity 10 updates the neighbor information of the MING (S840). Upon the reception of the IP handover report information (S850), the IP handover information of the MING is updated (S860). In this manner, the MING can be dynamically managed. Particularly, when the MN, which is handed over from the new PoA, transmits the neighbor report information, the MING is extended. In contrast, when the neighbor report information informing the neighbor relationship among the existing PoAs is not received over a predetermined time, the neighbor information may be deleted from the MING.

In light of the foregoing as set forth above, the network discovery can be realized in the heterogeneous network environment including a plurality of different networks. Especially, only the interface section corresponding to the neighbor network is activated to avoid unnecessary power consumption. In addition, since whether or not there is an IP handover is determined without additional message exchanges, the handover can be accelerated.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A network discovery method in a heterogeneous network environment, comprising:
   receiving Internet protocol (IP) handover information and neighbor information indicating a plurality of neighbor point of attachments (PoAs) of a current PoA from a Media Independent Information Service (MIIS) entity, at a mobile node that includes a plurality of communication interface sections capable of communicating with different networks, when the mobile node is connected to the current PoA;
   checking at least one neighbor PoA around current location of the mobile node among the neighbor PoAs using the neighbor information, at the mobile node; and
   in order to communicate with a next PoA, among the at least one checked neighbor PoA, to which a handover from the current PoA is to be made, activating at least one of the communication interface sections required to communicate with the checked at least one neighbor PoA, at the mobile node, wherein remaining communication interface sections are not activated,
   determining, at the mobile node, whether an IP network address of the mobile node is to be changed or not for the handover to be made from the current PoA to the next PoA, according to the IP handover information,
   wherein the IP handover information indicates whether a handover between the PoAs is an IP handover or not, and
   wherein the IP handover is a handover in which an IP network address of the mobile node is changed when the handover between the PoAs is made.

2. The network discovery method of claim 1, wherein the activating of the at least one of the communication interface sections powers up by supplying power to the at least one of the communication interface sections that corresponds to the checked at least one neighbor PoA.

3. The network discovery method of claim 1, further comprising:
   transmitting a neighbor information request to the MIIS entity, at the mobile node; and
   receiving the neighbor information from the MIIS entity that receives the request packet, at the mobile node.

4. The network discovery method of claim 3, wherein the MIIS entity stores a Media Independent Neighbor Graph (MING) that includes the neighbor information, and
   wherein the neighbor PoAs correspond to at least one heterogeneous network with respect to a current network that correspond to the current PoA.

5. The network discovery method of claim 4, wherein the MING is configured and stored in advance by a network administrator.

6. The network discovery method of claim 4, wherein the MING is configured or updated by neighbor report information transmitted from mobile nodes in the at least one heterogeneous network, and
wherein the neighbor report information includes information on PoAs from and to which the mobile nodes are handed over, and the neighbor report information is transmitted from the mobile nodes before and after respective handovers to the PoAs.

7. The network discovery method of claim 1, wherein the mobile node receives the neighbor information broadcast by the MIIS entity by periods.

8. The network discovery method of claim 7, wherein the mobile node receives the neighbor information broadcast from the current PoA by periods.

9. The network discovery method of claim 1, wherein the communication interface sections communicate according to one of Institute of Electrical and Electronics Engineers (IEEE) 802.3 standard, IEEE 802.11 standard, 802.16 standard, $3^{rd}$ Generation Partnership Project (3GPP) standard, and 3GPP2 standard, respectively, that correspond to the neighbor PoAs.

10. The network discovery method of claim 1, wherein the neighbor PoAs include at least one of an access point (AP) connected to a wireless local area network (WLAN), a remote access server (RAS) connected to a wireless metropolitan area network (WMAN), and a base station (BS) connected to a cellular network.

11. The network discovery method of claim 10, wherein the neighbor information indicates only a neighbor PoA to which the mobile node can be handed over.

12. The network discovery method of claim 4, wherein the MING further includes the IP handover information that informs the mobile node whether the handover between the current PoA and the next PoA requires the IP handover.

13. The network discovery method of claim 12, further comprising:
receiving, at the mobile node, the IP handover information from the MIIS entity; and
determining, at the MN, whether to change an IP network address according to the IP handover information for the handover from the current PoA to the next PoA.

14. A handover method in a heterogeneous network environment, comprising:
receiving Internet protocol (IP) handover information and neighbor information indicating a plurality of neighbor point of attachments (PoAs) of a current PoA from a Media Independent Information Service (MIIS) entity, at a mobile node (MN) that includes a plurality of communication interface sections capable of communicating with different networks, when the mobile node is connected to the current PoA;
checking at least one neighbor PoA among the neighbor PoAs using the neighbor information, at the mobile node;
in order to communicate with a next PoA, among the checked at least one neighbor PoA, to which a handover from the current PoA is to be made, activating at least one of the communication interface sections required to communicate with the checked at least one neighbor PoA, at the mobile node, wherein remaining communication interface sections are not activated;
determining, at the mobile node, whether an IP network address of the mobile node is to be changed or not for the handover to be made from the current PoA to the next PoA, according to the IP handover information,
performing the handover to the next PoA via the activated at least one communication interface section; and
transmitting to the MIIS entity, neighbor report information that includes information on the current PoA and the next PoA when the handover is completed,
wherein the IP handover information indicates whether a handover between the PoAs is an IP handover or not, and
wherein the IP handover is a handover in which an IP network address of the mobile node is changed when the handover between the PoAs is made.

15. The handover method of claim 14, further comprising:
transmitting to the MIIS entity IP handover report information that informs the IP handover is conducted, when an IP network address is changed during the handover of the mobile node.

16. A network discovery method in a heterogeneous network environment, comprising:
receiving a request from a mobile node that requests neighbor information, at a Media Independent Information Service (MIIS) entity that stores a Media Independent Neighbor Graph (MING) recording an IP handover information and the neighbor information relating to a plurality of neighbor point of attachments (PoAs) of a current PoA in a heterogeneous network with respect to a current network corresponding to the current PoA to which the mobile node is connected;
detecting the neighbor information from the MING, at the MIIS entity;
transmitting the detected neighbor information and Internet protocol (IP) handover information to the mobile node;
receiving, at the MIIS entity, from the mobile node, neighbor report information that includes information relating to the current PoA and a next PoA, among the neighbor PoAs in the heterogeneous network, to which the mobile node is handed over, when the handover is completed;
determining, at the mobile node, whether an IP network address of the mobile node is to be changed or not for a handover to be made from the current PoA to the next PoA, according to the IP handover information; and
updating, at the MIIS entity, the MING according to the neighbor report information,
wherein the IP handover information indicates whether a handover between the PoAs is an IP handover or not, and
wherein the IP handover is a handover in which an IP network address of the mobile node is changed when the handover between the PoAs is made.

17. The network discovery method of claim 16, wherein the MING is configured and stored in advance by a network administrator.

18. The network discovery method of claim 16, further comprising:
receiving, at the MIIS entity, from the mobile node, IP handover report information that informs that the IP handover is conducted during the handover; and
updating, at the MIIS entity, the MING according to the IP handover report information.

19. A network discovery method in a heterogeneous network environment, comprising:
configuring a Media Independent Neighbor Graph (MING) of a Media Independent Information Service (MIIS) entity that records IP handover information and neighbor information relating to a plurality of neighbor point of attachments (PoAs) of a current PoA in a heterogeneous network with respect to a current network corresponding to the current PoA to which a mobile node is connected;

broadcasting Internet protocol (IP) handover information and the neighbor information recorded in the MING by periods, at the MIIS entity;

receiving, at the MIIS entity, from the mobile node, neighbor report information that includes information relating to the current PoA and a next PoA, among the neighbor PoAs in the heterogeneous network, to which the mobile node is handed over, when the handover is completed;

determining, at the mobile node, whether an IP network address of the mobile node is to be changed or not for a handover to be made from the current PoA to the next PoA, according to the IP handover information; and updating, at the MIIS entity, the MING according to the neighbor report information, wherein the IP handover information indicates whether a handover between the PoAs is an IP handover or not, and wherein the IP handover is a handover in which an IP network address of the mobile node is changed when the handover between the PoAs is made.

20. The network discovery method of claim 19, wherein the MING is configured and stored in advance by a network administrator.

21. The network discovery method of claim 19, further comprising:

receiving, at the MIIS entity, from the mobile node, Internet protocol (IP) handover report information that informs that an IP handover is conducted during the handover; and updating, at the MIIS entity, the MING according to the IP handover report information.

22. A mobile node that operates in a heterogeneous network environment, comprising:

a plurality of interface sections operating in one of an active mode and a sleep mode and communicating with different networks in the active mode;

a communication section communicating with the different networks via one of the interface sections; and a controller switching an operation mode of at least one of the interface sections corresponding to at least one of a plurality of neighbor PoAs of a current PoA into the active mode from the sleep mode when Internet protocol (IP) handover information and neighbor information indicating the neighbor PoAs of the current PoA is received from a Media Independent Information Service (MIIS) entity while the mobile node is connected to the current PoA, wherein an operation mode of another at least one of the interface sections corresponding to at least one non-neighbor PoA of the current PoA that is not indicated in the neighbor information remains in the sleep mode, wherein the operation mode switching is performed to discover a next PoA, among the neighbor PoAs, for a handover from the current PoA to the next PoA, wherein the controller determines whether an IP network address of the mobile node is to be changed or not for the handover to be made from the current PoA to the next PoA, according to the IP handover information, wherein the IP handover information indicates whether a handover between the PoAs is an IP handover or not, and wherein the IP handover is a handover in which an IP network address of the mobile node is changed when the handover between the PoAs is made.

23. The mobile node of claim 22, wherein the controller powers up by supplying power to the at least one of the interface sections corresponding to the at least one of the neighbor PoAs, respectively.

24. The mobile node of claim 22, wherein the controller switches the operation mode of the at least one of the interface sections which corresponds to the at least one of the neighbor PoAs, into the active mode and the controller switches the operation mode of the rest of the interface sections into the sleep mode.

25. The mobile node of claim 24, wherein the controller requests transmission of the neighbor information by controlling the communication section to transmit a request for the neighbor information to the MIIS entity.

26. The mobile node of claim 24, wherein the communication section receives the neighbor information that is broadcast from the MIIS entity by periods.

27. The mobile node of claim 26, wherein the MIIS entity is included in the current PoA.

28. The mobile node of claim 24, wherein the controller transmits to the MIIS entity neighbor report information that records information relating to the current PoA and the next PoA when the handover is completed.

29. The mobile node of claim 28, wherein the controller controls the communication section to transmit to the MIIS entity IP handover report information that informs the IP handover is conducted when an IP network address is changed during the handover.

30. The mobile node of claim 29, wherein the communication section receives from the MIIS entity IP handover information that informs whether a handover between the neighbor PoAs requires the IP handover.

31. The mobile node of claim 30, wherein the controller determines whether to change the IP network address according to the IP handover information.

32. The mobile node of claim 24, wherein the neighbor PoAs include at least one of an access point (AP) connected to a wireless local area network (WLAN), a remote access server (RAS) connected to a wireless metropolitan area network (WMAN), and a base station (BS) connected to a cellular network.

33. The mobile node of claim 24, wherein the interface sections communicate according to one of Institute of Electrical and Electronics Engineers (IEEE) 802.3 standard, IEEE 802.11 standard, 802.16 standard, $3^{rd}$ Generation Partnership Project (3GPP) standard, and 3GPP2 standard.

34. The mobile node of claim 32, wherein the interface sections includes at least one of a first interface section supporting a communication standard for the WLAN, a second interface section supporting a communication standard for the WMAN, and a third interface section supporting a communication standard for the cellular network.

35. The mobile node of claim 24, wherein the neighbor information indicates only a neighbor PoA to which the mobile node can be handed over.

36. A Media Independent Information Service (MIIS) entity that operates in a heterogeneous network environment, comprising:

a storage storing a Media Independent Neighbor Graph (MING) that records Internet protocol (IP) handover information and neighbor information relating to a plurality of neighbor point of attachments (PoAs) of a current PoA in a heterogeneous network with respect to a current network corresponding to the current PoA to which a mobile node is connected; and a controller transmitting the neighbor information to the mobile node, wherein the MING is configured when the neighbor report information is transmitted from mobile nodes including the mobile node in the heterogeneous network, and wherein the neighbor report information includes information relating to the current PoA and a next PoA, among the neighbor PoAs, to which the mobile node is handed over, and the controller updates the MING according to the neighbor report information that is transmitted when the handover is completed, wherein the mobile node determines whether an IP network address of the mobile node is to be changed or not for the handover to be made from the current PoA to the next PoA, according to the IP handover information, wherein the IP handover information indicates whether a handover between the PoAs is an IP handover or not, and wherein the IP handover is a handover in which an IP network address of the mobile node is changed when the handover between the PoAs is made.

37. The MIIS entity of claim 36, wherein the controller transmits the neighbor information when a request is received from the mobile node.

38. The MIIS entity of claim 36, wherein the controller broadcasts the neighbor information recorded in the MING by periods.

39. The MIIS entity of claim 36, wherein the MING is configured and stored in advance by a neighbor administrator.

40. The MIIS entity of claim 36, wherein the MING further records the IP handover information that informs whether a handover between the current PoA and a next PoA among the neighbor PoAs requires the IP handover.

41. The MIIS entity of claim 40, wherein the controller transmits the IP handover information to the mobile node when a request is received by the mobile node in the heterogeneous network.

42. The MIIS entity of claim 41, wherein the controller updates the MING stored in the storage according to IP handover report information when the IP handover report information informing change of an IP network address is transmitted from another mobile node that is handed over in the heterogeneous network.

43. The network discovery method of claim 1, wherein the neighbor PoAs include at least one PoA corresponding to a homogeneous network and at least one PoA corresponding to a heterogeneous network with respect to the current PoA corresponding to a current network, and wherein the checked at least one PoA corresponds to one of the homogeneous network and the heterogeneous network.

44. The network discovery method of claim 1, wherein the neighbor PoAs do not include any PoA corresponding to a homogeneous network with respect to the current PoA corresponding to a current network, and wherein the checked at least one PoA corresponds to the heterogeneous network.

45. The network discovery method of claim 1, wherein the MIIS entity is included in the current PoA.

46. The mobile device of claim 22, wherein the neighbor PoAs include at least one PoA corresponding to a homogeneous network and at least one PoA corresponding to a heterogeneous network with respect to the current PoA corresponding to a current network.

47. The network discovery method of claim 1, wherein the neighbor PoAs do not include any PoA corresponding to a homogeneous network with respect to the current PoA corresponding to a current network.

48. The network discovery method of claim 1, wherein the MIIS entity is included in the current PoA.

* * * * *